US007795826B2

(12) United States Patent
Inoue

(10) Patent No.: US 7,795,826 B2
(45) Date of Patent: Sep. 14, 2010

(54) BRUSHLESS MOTOR DRIVING CIRCUIT AND MOTOR HAVING THE SAME CIRCUIT

(75) Inventor: Tomohiro Inoue, Tottori (JP)

(73) Assignee: Panasonic Corporation, Osaka (JP)

( * ) Notice: Subject to any disclaimer, the term of this patent is extended or adjusted under 35 U.S.C. 154(b) by 106 days.

(21) Appl. No.: 11/815,044

(22) PCT Filed: Dec. 14, 2006

(86) PCT No.: PCT/JP2006/324946

§ 371 (c)(1),
(2), (4) Date: Jul. 30, 2007

(87) PCT Pub. No.: WO2008/004322

PCT Pub. Date: Jan. 10, 2008

(65) Prior Publication Data

US 2010/0001668 A1    Jan. 7, 2010

(30) Foreign Application Priority Data

| Jul. 7, 2006 | (JP) | ................. 2006-187556 |
| Jul. 31, 2006 | (JP) | ................. 2006-207528 |
| Aug. 3, 2006 | (JP) | ................. 2006-211987 |

(51) Int. Cl.
   *H02P 6/08* (2006.01)
(52) U.S. Cl. ............... 318/400.03; 318/430; 318/432; 318/599
(58) Field of Classification Search ............ 318/400.03, 318/430, 432, 599, 400.08, 400.12
   See application file for complete search history.

(56) References Cited

U.S. PATENT DOCUMENTS

| 5,737,199 | A | * | 4/1998 | Kanamori et al. | ......... 363/56.03 |
| 7,265,514 | B1 | * | 9/2007 | Horng et al. | ........... 318/400.01 |
| 7,317,304 | B2 | * | 1/2008 | Sunaga et al. | ............... 323/225 |
| 7,375,486 | B2 | * | 5/2008 | Ku et al. | ..................... 318/599 |
| 7,560,897 | B2 | * | 7/2009 | Watanabe | ................... 318/811 |
| 7,626,838 | B2 | * | 12/2009 | Gunji | ....................... 363/56.04 |
| 7,630,616 | B2 | * | 12/2009 | Okubo | ........................ 388/829 |
| 7,714,523 | B2 | * | 5/2010 | Nakamura | .................. 318/53 |
| 2001/0023383 | A1 | * | 9/2001 | Ishihara et al. | ................ 701/41 |
| 2003/0020426 | A1 | * | 1/2003 | Narumi et al. | ............. 318/611 |
| 2004/0179830 | A1 | * | 9/2004 | Sunaga et al. | ............... 388/804 |
| 2005/0040880 | A1 | * | 2/2005 | Plojhar et al. | ............... 327/423 |
| 2005/0093730 | A1 | * | 5/2005 | Mourrier | .................... 341/152 |
| 2006/0018139 | A1 | * | 1/2006 | Kolomeitsev et al. | ....... 363/132 |

(Continued)

FOREIGN PATENT DOCUMENTS

| JP | 2-84812 A | 3/1990 |
| JP | 5-315910 A | 11/1993 |
| JP | 2002-5973 A | 1/2002 |
| JP | 2002-14125 A | 1/2002 |
| JP | 2002-238280 A | 8/2002 |

OTHER PUBLICATIONS

International Search Report for PCT/JP2006/324946, dated Mar. 20, 2007.

*Primary Examiner*—Paul Ip
(74) *Attorney, Agent, or Firm*—RatnerPrestia

(57) ABSTRACT

A brushless motor driving circuit includes a deviation detector for receiving a PWM input signal, which issues an instruction for rpm control, and detecting a deviation from duty ratio 50% of the PWM input signal, a determiner for detecting a comparison result at a threshold of duty ratio 50%, and a PWM output circuit for receiving a PWM reference signal having a duty ratio 50%, and producing a PWM driving signal, to be used for driving a brushless motor, in response to the deviation and the comparison result. The PWM driving signal is produced by adding the deviation to the PWM reference signal when the duty ratio of the PWM input signal is over 50%, and by subtracting the deviation from the PWM reference signal when the duty ratio is less than 50%.

13 Claims, 11 Drawing Sheets

U.S. PATENT DOCUMENTS

| | | | |
|---|---|---|---|
| 2006/0238950 A1* | 10/2006 | Sunaga et al. | 361/160 |
| 2007/0047928 A1* | 3/2007 | Ogino et al. | 388/804 |
| 2007/0096665 A1* | 5/2007 | Ku et al. | 318/66 |
| 2007/0165431 A1* | 7/2007 | Gunji | 363/98 |
| 2007/0223891 A1* | 9/2007 | Horng et al. | 388/811 |
| 2007/0293125 A1* | 12/2007 | Jenkins et al. | 446/454 |
| 2008/0252239 A1* | 10/2008 | Lin et al. | 318/400.06 |
| 2008/0309274 A1* | 12/2008 | Thomson | 318/567 |
| 2008/0315685 A1* | 12/2008 | Mandalakas et al. | 307/46 |
| 2009/0052215 A1* | 2/2009 | Watanabe | 363/131 |
| 2009/0134826 A1* | 5/2009 | Hamasaki | 318/400.32 |
| 2009/0230905 A1* | 9/2009 | Proctor et al. | 318/400.09 |

* cited by examiner

[Over 50%]

[Less than 50%]

BRUSHLESS MOTOR DRIVING CIRCUIT AND MOTOR HAVING THE SAME CIRCUIT

This application is a U.S. National Phase Application of PCT International Application PCT/JP2006/324946.

TECHNICAL FIELD

The present invention relates to a circuit for driving a brushless motor, and more particularly it relates to the circuit which employs a method of supplying a PWM signal from the outside as an instruction signal for controlling an rpm of the motor to a control circuit.

BACKGROUND ART

A circuit for driving a brushless motor employs a method of supplying a PWM (pulse width modulation) signal from the outside as an instruction signal for controlling an rpm of the motor to a control circuit. Because a device, to which the brushless motor is mounted, includes a microprocessor, which can produce a PWM signal as a control instruction signal with ease, so that an additional circuit such as a DA converter is not needed. This method thus has become widespread rapidly in these years. When this method is used, in order to detect a duty of a PWM signal supplied to the control circuit, the number of pulses (H1) during a high level of the PWM signal is divided in an arithmetic circuit by the number of pulses (W1) in one cycle of the PWM signal, as shown in equation 1.

$$pwmdty = \frac{H1}{W1} \qquad (1)$$

The arithmetic circuit thus needs a division circuit, so that the circuitry becomes complicated and bulky. To overcome this problem, a circuit for calculating a PWM duty without using the division calculation has been invented. This idea is disclosed in, e.g. cited patent reference 1.

FIG. 11 shows an instance of the foregoing idea. First counter 260 (16-bit) counts a digital signal which detects a duty ratio, and pulses of a first clock signal are added to "n" cycle period of the digital signal, and the number of the pulses of the first clock signal is counted for generating a data signal. Then 8-bit shift circuit 261 shifts the data signal generated by first counter 260 to 8-bit data and detects a data signal of higher order 8-bit, then first adder circuit 262 integrates the lower order 8-bit of the data signal. When the integration reaches a data signal of higher order 8-bit, a carry occurs. A corrected data formed by integrating the carry supplied from first adder circuit 262 into the higher order 8-bit data signal and the data signal obtained from second counter 266 are compared for obtaining a second clock signal. This second clock signal counts the number of pulses added to third counter 268 during the low level (level L) of "n" cycle period of the digital signal, thereby obtaining a duty ratio.

The foregoing method allows the signal of lower order 8-bit to be valid, so that a duty ratio of a digital signal can be detected with little error and without a cumbersome division circuit. However, an employment of the foregoing mechanism to an rpm control circuit, which controls the rpm of a brushless motor, needs a conversion circuit discussed below:

A PWM control circuit controls an rpm of a brushless motor in response to a duty of a PWM input signal. This PWM control circuit divides a PWM input signal into an accelerating region and a decelerating region at the threshold of duty 50%, i.e. the accelerating region covers the region over the duty 50% while the decelerating region covers the region the duty less than 50%. Thus the PWM control circuit determines whether or not the duty is over 50%, and detects a deviation (%) with respect to the duty 50%, then converts the PWM input signal into a signal (PWM driving signal) for driving the brushless motor.

A relation between a PWM input signal and a PWM driving signal is described with reference to FIG. 12. In FIG. 12, the region covering the duty over 50% of the PWM input signal is an accelerating region, and in this region the PWM driving signal needs to be converted from duty 0 (zero) % to 100%. To the contrary, in the region covering the duty less than 50%, namely, in a decelerating region, the PWM driving signal needs to be converted from duty 0% to −100% following an exciting procedure for conducting reverse-brake operation if a quick deceleration is needed.

Because of the situation discussed above, to control the rpm of the brushless motor by using the detected PWM duty data, the following two additional circuits are needed, i.e. a circuit for determining whether or not the duty is over 50% and a subtracting circuit for finding deviation data with respect to duty 50%. As a result, the structure becomes complicated.

In FIG. 11, duty-ratio data is obtained after the number of bits (8 bits) of third counter 268 passes, so that a time delay occurs between an input digital signal and the duty-ratio data. Thus the time delay becomes longer at a lower frequency of the input digital signal as well as a greater number of bits (e.g. 16 bits) of third counter 268, so that the time delay adversely influences the control over the rpm of the brushless motor.

When a PWM input signal has the same PWM frequency as a PWM driving signal, e.g. when PWM input signal has 500 Hz and PWM driving signal for the brushless motor has also 500 Hz, then the brushless motor generates sound having the frequency of 500 Hz, which is within the audible range and becomes offensive to ears. To overcome this problem, the PWM frequency needs to be converted to, e.g. 20 kHz higher than the audible range, for outputting a PWM driving signal. This preparation also makes the circuit structure complicated.

Cited Patent Reference 1: Unexamined Japanese Patent Publication No. 2002-238280.

DISCLOSURE OF INVENTION

A brushless motor driving circuit of the present invention comprises the following elements:

a deviation detector, which receives a PWM input signal issuing an instruction for an rpm control, for detecting a deviation in duty ratio of this signal with respect to duty ratio at 50%;

a determiner for detecting a comparison result at a threshold of duty ratio at 50%; and a PWM output circuit, which receives a PWM reference signal of duty ratio at 50%, for generating a PWM driving signal of the brushless motor in response to the deviation and the comparison result.

The PWM driving signal is generated by adding the deviation to the PWM reference signal when the PWM input signal has a duty ratio over 50%, and by subtracting the deviation from the PWM reference signal when the PWM input signal has a duty ratio less than 50%.

The brushless motor driving circuit further comprises the following elements:

a first counter, which receives a first clock signal, for outputting a high level period or a low level period of the PWM input signal and issuing an instruction for an rpm control as a count value of the first clock signal; and a second counter, which receives a second clock signal, for counting the second clock signal.

This driving circuit generates and outputs a PWM driving signal of the brushless motor based on a high level period or a low level period which has been needed for the second counter to count until its count value agrees with the count value supplied from the first counter.

The foregoing structure allows detecting every duty without using the division circuit as the arithmetic circuit, so that control instruction data free from time delay is obtainable in the circuit controlling the rpm, and the rpm of the brushless motor can be controlled with this data.

Figure 1:
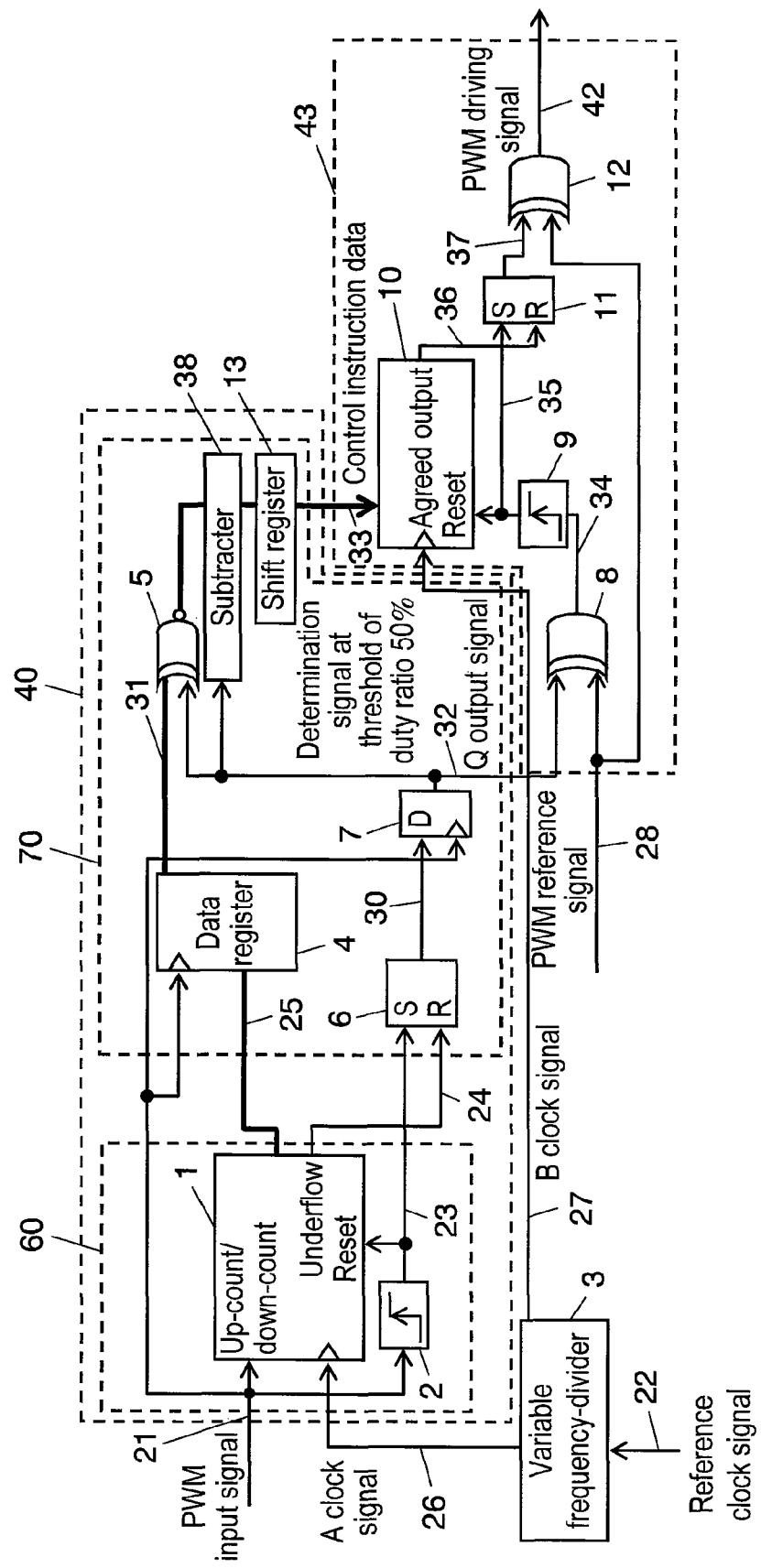
FIG. 1 shows a block diagram illustrating a PWM control detecting circuit and a PWM output circuit of a brushless motor driving circuit in accordance with a first embodiment of the present invention.

DESCRIPTION OF REFERENCE MARKS 1, 101 N-bit up/down counter
2 first edge-sensing circuit
3, 103 variable frequency-divider
4, 104 data register
5 exclusive NOR gate
6 first latch circuit
7 D flip-flop
8 exclusive OR gate (first exclusive OR gate)
9 second edge sensing circuit
10, 110 N-bit counter (second counter)
11 second latch circuit
12 exclusive OR gate (second exclusive OR gate)
13 shift register
21, 121 PWM input signal
22, 122 reference clock signal
23 reset signal
24 underflow signal
25, 125 N-bit data
26, 126 A clock signal (first clock signal)
27, 127 B clock signal (second clock signal)
28 PWM reference signal
30 output from latch circuit
31 output from data register
32 Q output signal
33, 133 control instruction data
36, 136 agreed output
38 subtracter
40, 140 PWM control detecting circuit
42, 142 PWM driving signal
43, 143 PWM output circuit
44, 144 hall-signal amplifying and waveform converting circuit
45, 145 output circuit
46, 146 PWM driving circuit
47, 48, 49, 147, 148, 149 winding coil
50, 150 motor section
51, 52, 53, 151, 152, 153 position sensor
60 deviation detector
70, 71 determiner

DESCRIPTION OF PREFERRED EMBODIMENTS

Exemplary embodiments of the present invention are demonstrated hereinafter with reference to the accompanying drawings.

Exemplary Embodiment 1

Figure 3:
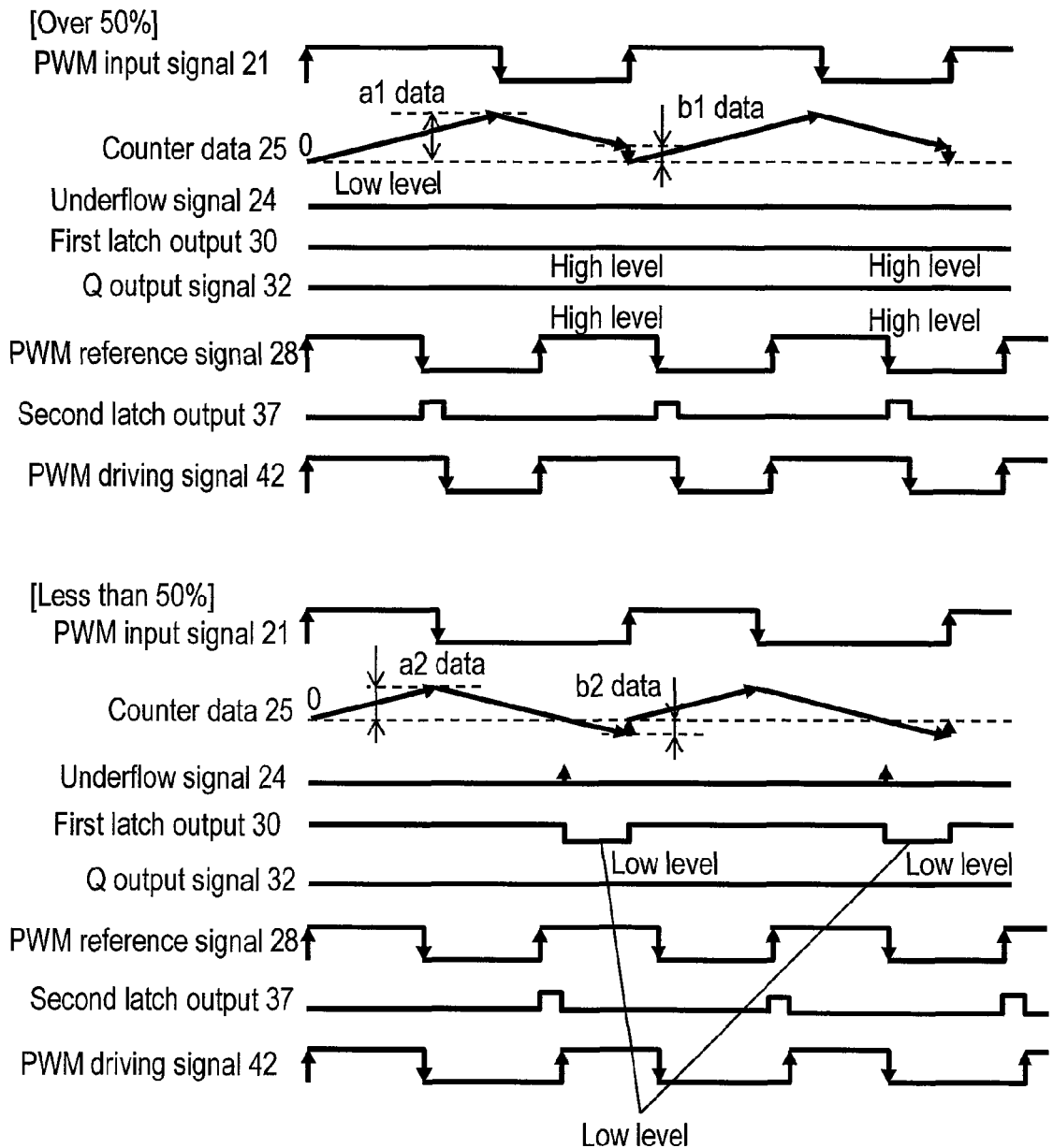
FIG. 3 shows timing charts illustrating operation of the PWM control detecting circuit and the PWM output circuit in accordance with the first embodiment of the present invention.

FIG. 1 shows a block diagram illustrating a PWM control detecting circuit and a PWM output circuit in a brushless motor driving circuit in accordance with the first embodiment of the present invention, and FIG. 3 shows the timing charts of these circuits. The brushless motor driving circuit shown in FIG. 1 comprises the following elements: PWM control detecting circuit 40 having deviation detector 60 and determiner 70, and PWM output circuit 43.

Deviation detector 60 receives PWM input signal 21, which issues an instruction for rpm control, and detects deviation from duty ratio 50%. Determiner 70 receives an output signal from deviation detector 60, and detects a comparison result at a threshold at duty ratio 50%. PWM output circuit 43 receives PWM reference signal 28 of duty ratio 50%, and generates PWM driving signal 42 of the brushless motor in response to both of the deviation, i.e. the output signal from deviation detector 60, and the comparison result, i.e. the output signal from determiner 70.

A structure used in this embodiment is further detailed. In FIG. 1, a first counter (hereinafter referred to as "N-bit up/down counter 1") up-counts a first clock signal (hereinafter referred to as "A clock signal 26") generated by dividing the frequency of reference clock signal 22 with variable frequency divider 3 when PWM input signal 21 stays on a high level. It also down-counts A clock signal 26 when PWM input signal 21 stays on a low level. When this count value underflows, N-bit up/down counter 1 outputs underflow signal 24, and counter 1 is reset by reset signal 23 supplied from first edge sensing circuit 2 which senses a rising edge of PWM input signal 21.

N-bit data 25 output from N-bit up/down counter 1 is put into data register 4 at the rising edge of PWM input signal 21, and underflow signal 24 is retained at first latch circuit 6 by an output from edge sensing circuit 2.

Output 30 from first latch circuit 6 is connected to D input of flip-flop 7, and is put into flip-flop 7 at the rising edge of PWM input signal 21, then is output as Q output signal 32, which is then input to exclusive NOR gate 5 together with output 31 from data register 4. The output from NOR gate 5 is supplied to subtracter 38 that subtracts 1 (one) from its input. Subtracter 38 is controlled its subtracting process by Q output signal 32 supplied from D flip-flop 7. When no subtraction is needed, subtracter 38 just outputs its input as it is. An output from subtracter 38 is supplied to shift register 13, and is shifted to the right by one bit, then is output as control instruction data 33. What is discussed hereinbefore is an outline of PWM control detecting circuit 40 including deviation detector 60 and determiner 70.

As the timing chart in FIG. 3 shows, when PWM input signal 21 has a duty over 50% (shown on upper side in FIG. 3), the up-counted number is greater than the down-counted number. Counted number "b1" remains after subtraction of the down-counted number from the up-counted one as a counted number. When signal 21 has a duty less than 50% (shown in lower side in FIG. 3), an underflow occurs, and the counted number becomes a remainder after the subtraction of "b2" from the full bits of N-bit, i.e. the counted number is "b2n" which is a complement of "b2".

When N-bit up/down counter 1 supplies no underflow signals, i.e. when PWM input signal has a duty over 50%, first latch circuit 6 stays in a set status, and Q output signal 32 supplied from D flip-flop 7 becomes a high level. Therefore, when PWM input signal has a duty over 50%, exclusive NOR gate 5, to which output 31 from data register 4 and Q output signal 32 from D flip-flop 7 are input, outputs counted value "b1" as it is counted at down-counting and put into data register 4. Subtracter 38 outputs its input as it is without implementing a subtraction when Q output signal 32 from D flip-flop 7 stays in the high-level. The output from exclusive NOR gate 5 passes through subtracter 38 as it is and enters into shift register 13, then is shifted to the right by one bit, so that shift register 13 outputs control instruction data 33 which is a half of counted value "b1".

Next, when N-bit up/down counter 1 supplies underflow signal 24, i.e. when PWM input signal has a duty less than 50%, a counted number becomes a remainder after the subtraction of "b2" from the full bits of N-bit, i.e. the counted number is "b2n" which is a complement of "b2".

Then first latch circuit 6 is reset, and Q output signal 32 from D flip-flop 7 becomes the low-level. Thus when PWM input signal has a duty less than 50%, exclusive NOR gate 5, to which output 31 from data register 4 and Q output signal 32 from D flip-flop 7 are input, outputs a reverse value to "b2n" counted at down-counting when "b2n" is put into data register 4, and this output is supplied to subtracter 38. Since subtracter 38 is designed to subtract 1 (one) from its input when Q output signal 32 from D flip-flop 7 stays in the low-level, the value subtracted 1 (one) from the reverse value of "b2n", i.e. "b2", is output from subtracter 38. The output from subtracter 38 is supplied to shift register 13, and shifted to the right by 1 (one) bit, so that shift register 13 outputs control instruction data 33 that is a half of the complement "b2" of counted value "b2n".

Operation of the foregoing PWM control detecting circuit is detailed hereinafter. N-bit up/down counter 1 up-counts when PWM input signal 21 stays on the high level, and down-counts when signal 21 stays on the low level. As shown in FIG. 3, when the duty is over 50%, the up-counted number is greater than the down-counted number. Assume that the difference in the counted numbers is "b1", which is an output from N-bit up/down counter 1 in down-counting.

When the duty is less than 50%, an underflow occurs, and counted number becomes "b2n" which is a complement of "b2" fewer than the full bits of N-bit by "b2". Thus it can be concluded that when no underflow occurs, the duty is over 50%. This case is described hereinafter.

The counted number at duty=50% corresponds to a half cycle of PWM input signal 21, and this counted number is referred to as "dHalf". As equation (2) described below shows, counted number "a1" in up-counting is greater than the "dHalf" by "a". In down-counting, "a1" is down counted by (dHalf−α) and becomes the final counted number "b1". Equation (3) can be thus established.

$$a1 = d\text{Half} + \alpha \quad (2)$$

$$b1 = a1 - (d\text{Half} - \alpha) \quad (3)$$

Both sides of equation (3) are subtracted from equation (2) to eliminate "α" to find equation (4).

$$d\text{Half} = a1 - \frac{b1}{2} \quad (4)$$

As discussed above, a subtraction of a half of "b1" in down-counting from "a1" in up-counting will result in "dHalf" which corresponds to a half cycle of PWM input signal 21. Based on equations (2) and (4), duty "pwmdty" of PWM input signal 21 can be calculated by using equation (5).

$$pwmdty = \left(d\text{Half} + \frac{b1}{2}\right) \div (2 \times d\text{Half}) = 0.5 + \frac{\frac{b1}{2}}{2 \times d\text{Half}} \quad (5)$$

In other words, a half of down-counted value "b1" corresponds to a deviation from duty 50%.

Next, when an underflow occurs, the duty is less than 50%. This case is described hereinafter. As shown by equations (6) and (7) described below, counted value "a2" in up-counting and a half of "b2" are added together, which results in counted number "dHalf" corresponding to a half cycle of PWM input signal 21. In this connection, "b2" is a complement of "b2n" resulting from inversion and subtraction of 1 (one) from counted number "b2n".

$$b2 = \overline{b2n} - 1 \quad (6)$$

$$d\text{Half} = a2 + \frac{b2}{2} \quad (7)$$

The duty "pwmdty" of PWM input signal 21 can be calculated by equation (8).

$$pwmdty = \left(dHalf - \frac{b2}{2}\right) \div (2 \times dHalf) = 0.5 + \frac{\frac{b2}{2}}{2 \times dHalf} \quad (8)$$

In other words, a half of complement "b2" of down-counted value "b2n" corresponds to a deviation from duty 50%.

Figure 2:
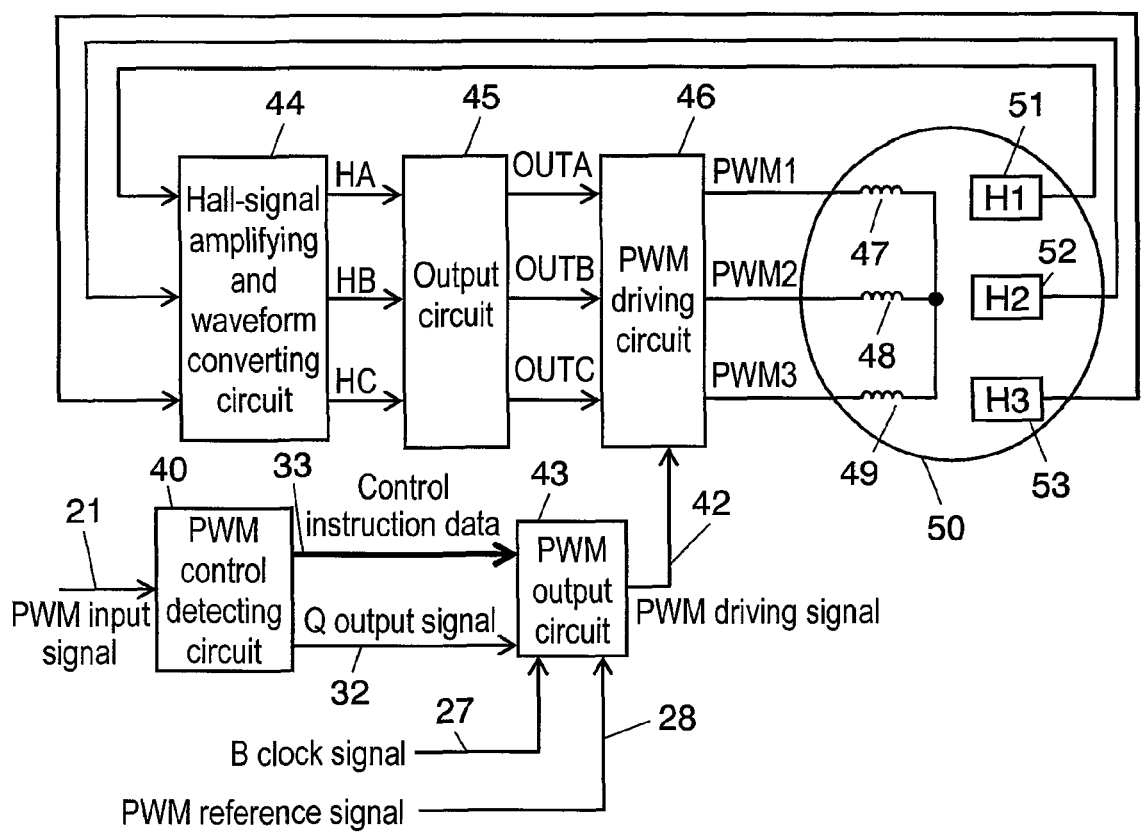
FIG. 2 shows a block diagram illustrating the brushless motor driving circuit in accordance with the first embodiment of the present invention.

A structure of the brushless motor of the present invention is described hereinafter. FIG. 2 shows a block diagram of a driving circuit of the brushless motor. In FIG. 2, motor section 50 of the brushless motor includes position sensors 51, 52, 53, and stator coils 47, 48, 49. Position sensors 51, 52, 53 sense the position of the rotor, and their outputs are waveform-shaped by hall-signal amplifying and waveform converting circuit 44, and then the outputs are supplied to output circuit 45, which generates a driving signal that issues an instruction for a switch timing about exciting stator coils 47, 48, and 49. PWM driving circuit 46 controls a duty ratio of a current which drives stator coils 47, 48 and 49, thereby controlling an rpm of the motor.

Control instruction data 33 and Q output signal 32 supplied from PWM control detecting circuit 40 generate PWM driving signal 42 that drives PWM driving circuit 46 via PWM output circuit 43.

A procedure of how to produce PWM driving signal 42 shown in FIG. 2 from PWM control detecting circuit 40 via PWM output circuit 43 is detailed hereinafter with reference to FIG. 1. In FIG. 1, Q output signal 32 of D flip-flop 7 supplied from PWM control detecting circuit 40 and PWM reference signal 28 at duty 50% to be used for driving the brushless motor are input to exclusive OR gate 8, and output signal 34 from OR gate 8 is input to second edge sensing circuit 9 for sensing a rising edge.

Control instruction data 33 supplied from PWM control detecting circuit 40 is input to the second counter (hereinafter referred to as "N-bit counter 10"), which is reset by signal 35, i.e. an output from second edge sensing circuit 9, and N-bit counter 10 starts up-counting until a second clock signal, which is produced by frequency-dividing the reference clock signal 22 by variable frequency divider 3, agrees with control instruction data 33.

When the counted value agrees with the value of control instruction data 33, N-bit counter 10 outputs agreed output 36, and stops the up-count. Agreed output 36 is input to the reset side of second latch circuit 11, and latched by output signal 35 supplied from second edge sensing circuit 9 to the set side of latch circuit 11. Output 37 from second latch circuit 11 and PWM reference signal 28 are input to exclusive OR gate 12, and are output from exclusive OR gate 12 as PWM driving signal 42 which controls the rpm of the brushless motor.

The foregoing structure allows PWM reference signal 28 at duty 50% to be modulated by control instruction data 33 and Q output signal 32 of D flip-flop 7 both supplied from PWM control detecting circuit 40, thereby producing PWM driving signal 42 to be used for driving the brushless motor.

The procedure of how to produce PWM driving signal 42 is more detailed hereinafter with reference to FIG. 3. When PWM input signal 21 has a duty over 50%, Q output signal 32 of D flip-flop stays on a high level, so that output 34 from exclusive OR gate 8 turns to a high level at the timing when PWM reference signal 28 turns to a low level. Second edge sensing circuit 9 senses a rising edge of output 34, and output 35 from edge sensing circuit 9 resets N-bit counter 10, which then starts up-counting B clock signal 27. This up-count continues until a counted value agrees with control instruction data 33 set in N-bit counter 10 in advance, then N-bit counter 10 outputs agreed output 36 before it stops the up-count. Output 35 from edge sensing circuit 9 is latched by this agreed output 36 at second latch circuit 11. In other words, when a counted value in up-counting by N-bit counter 10 agrees with control instruction data 33, output 37 from second latch circuit 11 is latched, and turned to a low level. As a result, the output from exclusive OR gate 12, to which PWM signal 28 and output 37 from second latch circuit 11 are input, turns to a low level from a high level where this output has kept staying while output 37 from second latch circuit 11 stays on a high level. In other words, the period of high level of PWM signal 28 extends by a period from starting the count of N-bit counter 10 until the counted value agrees with control instruction data 33, so that PWM driving signal 42 having a duty over 50% is produced.

When PWM input signal 21 has a duty less than 50%, Q output signal 32 of D flip-flop 7 stays on the low level, so that exclusive OR gate 8 outputs PWM signal 28 intact as its output 34. At the moment when PWM reference signal 28 turns to the high level, its rising edge is sensed by second edge sensing circuit 9, of which output 35 then resets N-bit counter 10, and N-bit counter 10 starts up-counting B clock signal 27. It continues the up-count until a counted value agrees with control instruction data 33, which has been set in N-bit counter 10 in advance, and supplies agreed output 36 before it stops the up-count.

Output 35 from edge sensing circuit 9 is latched by this agreed output 36 at second latch circuit 11. In other words, when the up-count by N-bit counter 10 agrees with control instruction data 33, output 37 from second latch circuit 11 is latched, and turned to the low level. As a result, the output from exclusive OR gate 12, to which PWM reference signal 28 and output 37 from second latch circuit 11 are input, turns to the high level from the low level where this output has kept staying while output 37 from second latch circuit 11 stays on the high level. In other words, the period of low level of PWM signal 28 extends by a period from starting the count of N-bit counter 10 until the counted value agrees with control instruction data 33, so that PWM driving signal 42 having a duty (high level) less than 50% is produced.

As discussed above, according to the structure of this first embodiment, a deviation from duty 50% and a determination signal whether the duty is over 50% or less than 50% can be produced without a direct detection of a duty of a PWM (digital) input signal, so that a division circuit is not needed. On top of that, this structure allows detecting every duty of PWM input signal. As a result, the circuit controlling the rpm of the brushless motor can work free from a time delay.

The deviation from duty 50% and the determination signal whether the duty is over 50% or less than 50% are produced, and the deviation is added/subtracted to/from a PWM signal in response to the determination signal, which PWM signal has duty 50% and is prepared independently of the PWM input signal, thereby producing a PWM driving signal to be used for driving the brushless motor. As a result, degree of freedom about setting the PWM driving signal can become larger advantageously.

In the input side, assume that A clock signal 26 has a frequency of "f clock A" and PWM input signal 21 has a frequency of "f PWM input signal", a duty ratio is expressed by equation (9) described below when a deviation is counted "b1".

$$\frac{b1}{2} \times \frac{\frac{1}{f \text{ clock } A}}{\frac{1}{f \text{ PWM input signal}}} \qquad (9)$$

In a similar way, assume that B clock signal 27 has a frequency of "f clock B" and PWM input signal 42 has a frequency of "f PWM driving signal", a duty ratio is expressed by equation (10) described below when a deviation is counted "b1".

$$\frac{b1}{2} \times \frac{\frac{1}{f \text{ clock } B}}{\frac{1}{f \text{ PWM driving signal}}} \qquad (10)$$

Since a drive gain is a ratio of output duty ratio vs. input duty ratio, the drive gain can be calculated by equation (11) described below.

$$\text{driving gain} = \frac{\frac{f \text{ PWM driving signal}}{f \text{ clock } B}}{\frac{f \text{ PWM input signal}}{f \text{ clock } A}} \qquad (11)$$

$$= \frac{f \text{ clock } A}{f \text{ clock } B} \times \frac{f \text{ PWM driving signal}}{f \text{ PWM input signal}}$$

In this first embodiment, both of A clock signal 26 and B clock signal 27 of PWM control detecting circuit 40, which signal 27 is to be used for producing the PWM driving signal, can frequency-divide reference clock signal 22 at any ratio by using variable frequency divider 3. In other words, the ratios expressed in equation (11) are adjustable. At the same time, an appropriate setting of PWM reference signal 28 allows differing the frequency of PWM input signal 21 from that of PWM driving signal while the duty of PWM input signal 21 is kept holding. It also allows differing the frequency of PWM input signal 21 from that of PWM driving signal while the drive gain is kept holding.

For instance, assume that PWM input signal 21 has a frequency of 1 kHz, and A clock signal 26 has a frequency of 100 kHz, and use of the frequency of PWM input signal 21, i.e. 1 kHz, as the frequency of PWM driving signal 42 will produce noises because this 1 kHz is an audible frequency. To avoid this problem, if the frequency of PWM driving signal 42 is to increase, since the PWM control is done with the duty of PWM input signal 21, it is necessary to increase the frequency of PWM driving signal 42 while the duty of PWM input signal 21 is kept holding.

Think of the case where the frequency of PWM driving signal 42 is raised to 10 kHz (10 times of the frequency of PWM input signal 21) hereinafter. In this case, assume that PWM input signal 21 has a duty of 60%, then control instruction data 33, which outputs a deviation (a counted value) from the duty of 50%, becomes 10 counts (decimal system) because the frequency ratio of PWM input signal 21 vs. A clock signal is 1:100.

Then the amount of 10 counts of B clock signal is added to PWM reference signal 28 having a duty of 50%, thereby producing PWM driving signal 42. Therefore, if a duty of PWM driving signal 42 needs to be 60% equal to the duty of PWM input signal 21, the amount of 10 counts of B clock signal can be set as corresponding to 10%, i.e. the deviation from duty 50% of PWM driving signal 42.

To be more specific, an increase of the frequency of PWM driving signal 42 up to 10 kHz needs to equalize the following two ratios while its duty is kept at the same as that of PWM input signal 21: a frequency ratio of PWM input signal 21 vs. A clock signal 26, and a frequency ratio of PWM driving signal 42 vs. B clock signal. Thus the frequency of B clock signal should be increased up to 1000 kHz, namely 10 times that of A clock signal 26.

In this first embodiment, the drive gain in the rpm of the brushless motor can be varied. When the frequency ratio of PWM driving signal 42 vs. PWM input signal 21, namely, "f PWM driving signal" vs. "f PWM input signal", is fixed at 1/10, i.e. 1 kHz/10 kHz, equation (11) tells that a change in the frequency ratio of clock B vs. clock A, i.e. "f clock B/f clock A, will vary the drive gain.

Figure 4:
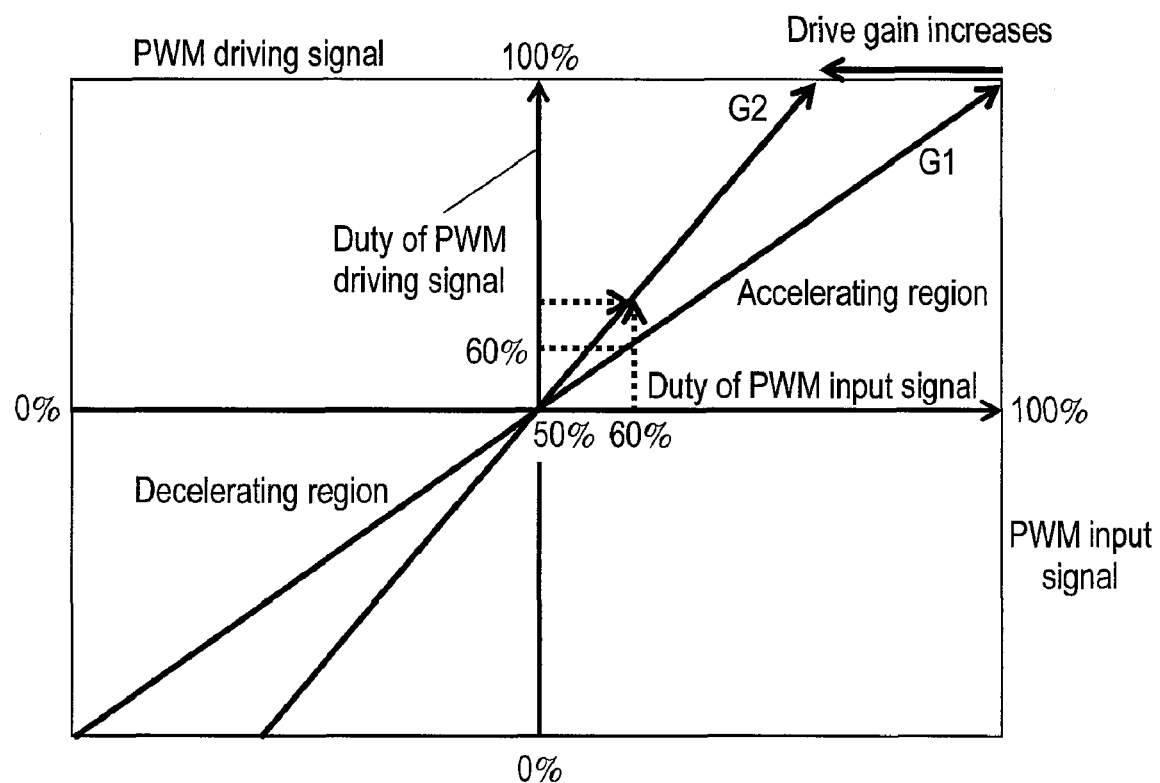
FIG. 4 shows a graph illustrating relations between inputs and outputs of a PWM control detecting circuit that outputs a PWM driving signal in accordance with the first embodiment of the present invention.

FIG. 4 shows a graph illustrating relations between a PWM input signal and a PWM driving signal, where X axis represents a duty of PWM input signal and Y axis represents a duty of PWM driving signal. In FIG. 4, graph G1 shows the relation expressed by equation (12).

$$f \text{ PWM driving signal[Hz]} = \frac{f \ B \text{ clock[Hz]}}{N(\text{bit})} \qquad (12)$$

A greater slant makes the deviation of PWM driving signal from duty 50% greater than the deviation of PWM input signal, namely, the drive gain becomes greater as the slant becomes greater. As graph G2 in FIG. 4 shows, setting the relation as expressed by equation (13) allows increasing the drive gain in the rpm of the brushless motor.

$$f \text{ PWM driving signal[Hz]} > \frac{f \ B \text{ clock[Hz]}}{N(\text{bit})} \qquad (13)$$

In the instance discussed above, when the frequency of PWM driving signal is raised up to 10 kHz, i.e. 10 times the frequency of PWM input signal, setting the frequency of B clock signal at lower than 1000 kHz allows extending B clock cycle. Then a necessary time for agreeing the value of control instruction data 33 (this value is determined by the duty ratio of PWM input signal 21, and in the foregoing instance, this value is 10 at duty ratio 60%) with a counted value by N-bit counter which counts B clock becomes longer, so that the duty ratio of PWM driving signal becomes greater than 60%. Since the deviation from duty 50% should be controlled, the drive gain becomes greater.

To the contrary, setting the frequency of B clock signal at over 1000 kHz will reduce the drive gain. In other words, a change in the first clock (A clock signal) frequency which is input to N-bit up/down counter 1 in PWM control detecting circuit 40 and a change in the second clock (B clock signal) frequency which is input to N-bit counter 10 that generates PWM driving signal 42 can vary the drive gain of the brushless motor.

In this embodiment, to make the output from data register 4 a half after undergoing exclusive NOR gate 5, shift register 13 for one-bit shift to the right is provided; however, double the frequency of B clock signal with respect to A clock signal, then an output from data register 4 can be used as PWM control instruction data 33, so that shift register 13 of the present invention can be eliminated.

Exemplary Embodiment 2

Figure 5:
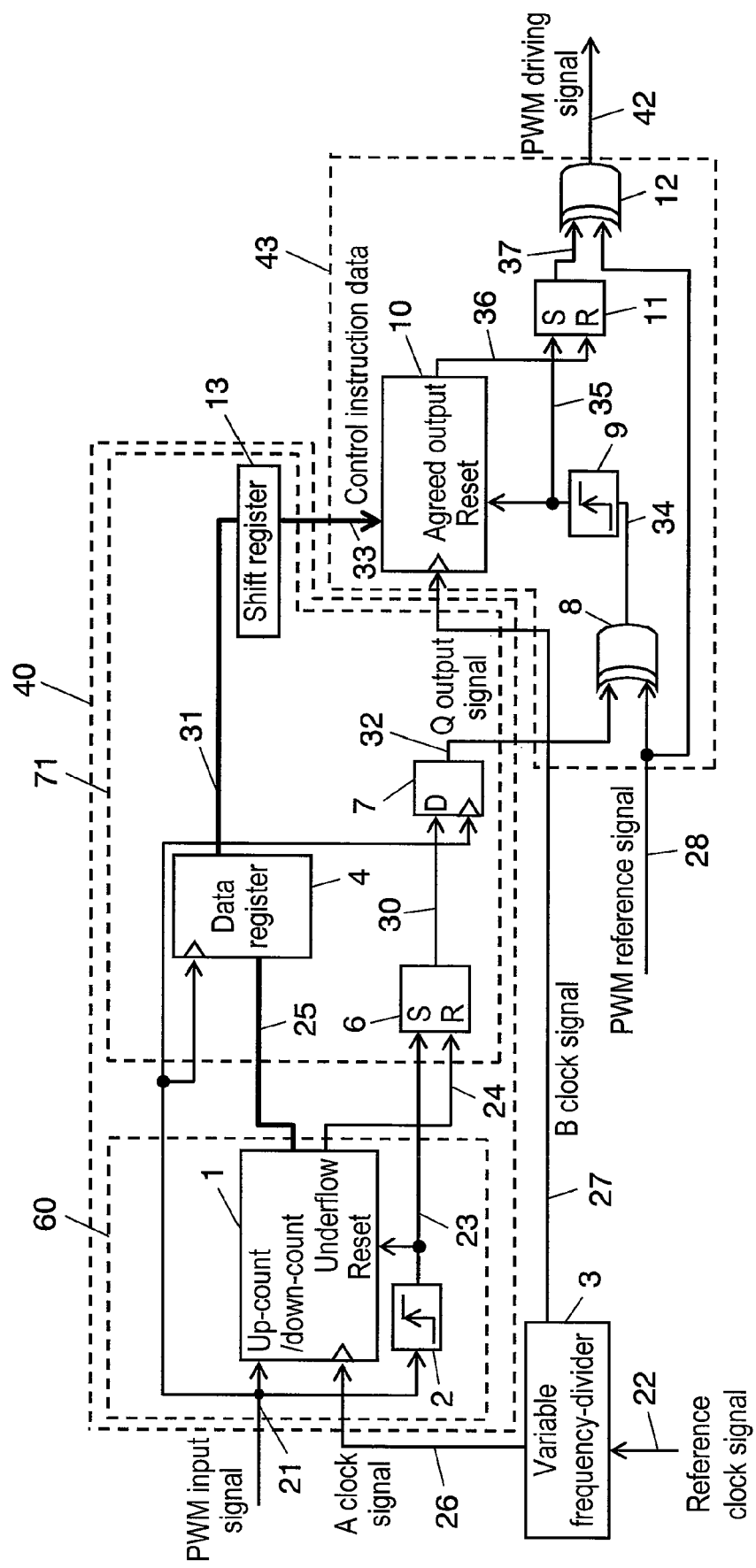
FIG. 5 shows a block diagram illustrating a PWM control detecting circuit and a PWM output circuit in a brushless motor driving circuit in accordance with a second embodiment of the present invention.

FIG. 5 shows a block diagram illustrating a PWM control detecting circuit and a PWM output circuit of a brushless motor driving circuit in accordance with the second embodiment of the present invention. Operation of the PWM control detecting circuit is detailed hereinafter. The brushless motor driving circuit shown in FIG. 5 includes PWM control detecting circuit 40 having deviation detector 60 and determiner 71, and PWM output circuit 43. The second embodiment differs from the first one in the structure of determiner 71. Similar elements to those in the first embodiment have the same reference marks, and the descriptions thereof are omitted here.

When PWM input signal 21 stays on a high level, N-bit up/down counter 1 up-counts, and when it stays on a low level, the counter down-counts. As shown in FIG. 4, when the duty is over 50% (the high level period is longer than the low level period), the up-count counts more numbers than the down-count does. This difference in the counted numbers is referred to as "b1". When the duty is less than 50%, an underflow occurs, and at the same time, N-bit up/down counter 1 switches over to the up-count again.

As a result, when no underflow occurs, as the first embodiment describes, counted number "dHalf" corresponding to a half cycle of PWM input signal 21 is obtained by equation (4), and duty "pwmdty" of PWM input signal 21 is obtained by equation (5). No underflow thus corresponds to an acceleration instruction for the brushless motor driving circuit, because the duty is over 50%, and a half of down-counted value corresponds to a deviation from the duty 50%.

Next, when an underflow occurs, since the duty is less than 50%, N-bit up/down counter 1 switches over to the up-count again, so that counted number "b2" at the down-count is obtainable directly, which differs from the first embodiment. In other words, equation (6) is not needed.

In a similar way to that of the first embodiment, counted number "dHalf" corresponding to a half cycle of PWM input signal 21 is obtained by equation (7), and duty "pwmdty" of PWM input signal 21 is obtained by equation (8). As a result, when an underflow occurs, a half of complement "b2" to the down-counted value "b2n" indicates the deviation from duty 50%, and it works as a deceleration instruction.

Figure 6:
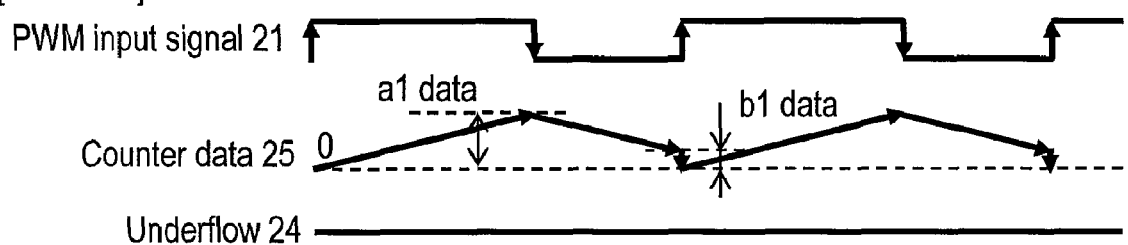
FIG. 6 shows timing charts illustrating operation of the PWM control detecting circuit and the PWM output circuit in accordance with the second embodiment of the present invention.
Figure 6:
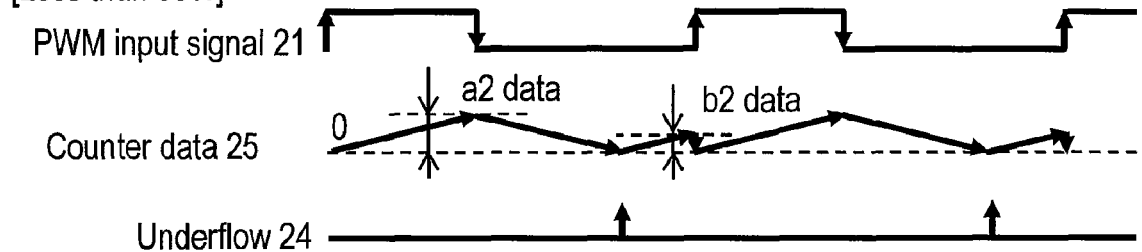

FIG. 6 shows timing charts illustrating operation in accordance with the second embodiment of the present invention. In FIG. 6, N-bit up/down counter 1 is used, and counter 1 down-counts A clock signal 26 when PWM input signal 21 stays on a low level, and outputs underflow signal 24 when a counted value underflows. At the same time, counter 1 switches over to the up-count. Use of this counter 1 allows directly obtaining counted number "b2" at the down-count when the underflow occurs, so that output 31 from data register 4 needs not to be inverted, which simplifies the circuit structure.

In the foregoing discussion, both of N-bit up/down counter 1 and N-bit counter 10 work as up-counters when PWM input signal 21 stays on the high level. If they work also as the up-counters when PWM input signal 21 stays on the low level, the timing when duty is over 50% and the timing when duty is less than 50% become reverse order, and others remain unchanged, so that both of control instruction data 33 and Q output signal 32 can be detected in a similar manner to what is discussed previously.

Exemplary Embodiment 3

Figure 7:
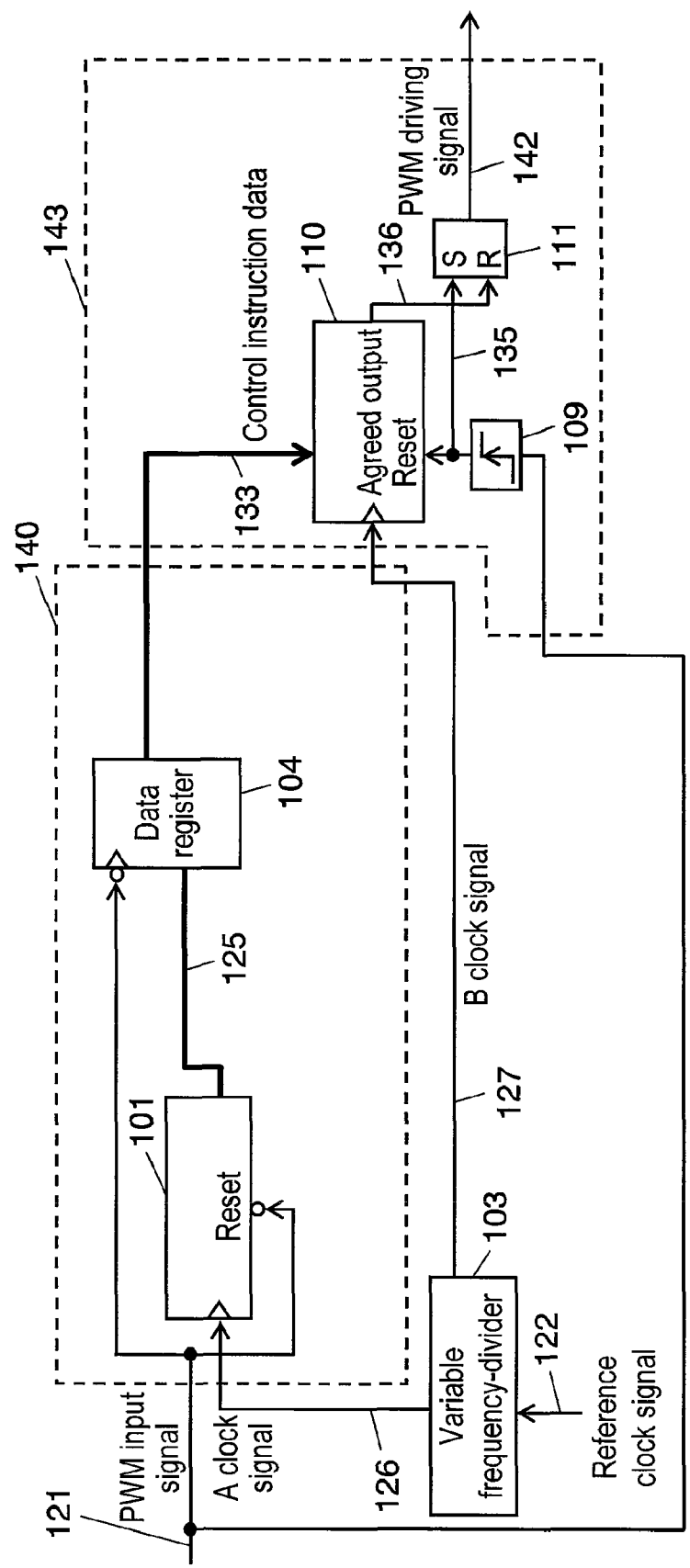
FIG. 7 shows a block diagram illustrating a PWM control detecting circuit and a PWM output circuit in a brushless motor driving circuit in accordance with a third embodiment of the present invention.
Figure 9:
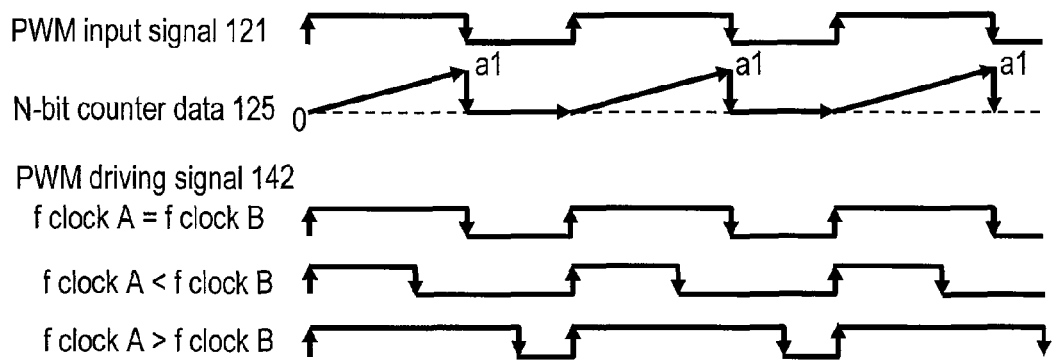
FIG. 9 shows timing charts illustrating operation of the PWM control detecting circuit and the PWM output circuit in accordance with the third embodiment of the present invention.

FIG. 7 shows a block diagram illustrating a brushless motor driving circuit in accordance with the third embodiment of the present invention. FIG. 9 shows timing charts in accordance with the third embodiment. In FIG. 7, a first counter (hereinafter referred to as N-bit counter 101) up-counts a first clock signal (A clock signal 126) when PWM input signal 121 stays on a high level. This A clock signal 126 is produced by frequency-dividing the reference clock signal 122 with variable frequency divider 103. Counter 101 resets the count when PWM input signal 121 stays on a low level. PWM control detecting circuit 140 is formed of counter 101 and data register 104. This data register 104 receives N-bit counter data 125 supplied from counter 101 at a falling edge of PWM input signal 121.

PWM output circuit 143, which generates and outputs PWM driving signal 142 to be used for driving the brushless motor, is formed of edge sensing circuit 109, a second counter (N-bit counter 110) and latch circuit 111. Edge sensing circuit 109 senses a rising edge of PWM input signal 121. N-bit counter 110 is reset by output signal 135 from edge sensing circuit 109, and up-counts a second clock signal (B clock signal 127) until its counted value agrees with control instruction data 133 supplied from data register 104. The B clock signal 127 is produced by frequency-dividing the reference clock signal 122 independently of the first clock signal with frequency divider 103. When they agree with each other, counter 110 outputs agreed output 136 before it stops the up-count.

When the value counted by N-bit counter 110 agrees with control instruction data 133, latch circuit 111 is reset by agreed output 136 and turns to the low level. Thus, during the time span from when N-bit counter 110 starts counting until the counted value agrees with data 133, PWM driving signal 142 staying on a high level is produced.

The foregoing structure in accordance with the third embodiment allows controlling the rpm by directly using a duty of the PWM (digital) input signal, so that a division circuit is not needed, and every duty of the PWM input signal can be used as it is. The circuit controlling the rpm of the brushless motor thus can control the rpm free from time delay.

Assume that the frequency of A clock signal 126 is "f clock A" and the frequency of PWM input signal 121 is "f PWM input signal" on the input side, then duty ratio "Pdin" when N-bit count data 125 is "a1" is expressed by equation (14) described below:

$$Pdin = a1 \times \frac{\frac{1}{f \text{ clock } A}}{\frac{1}{f \text{ PWM input signal}}} \tag{14}$$

In a similar way, on the output side, assume that the frequency of B clock signal 127 is "fclockB" and the frequency of PWM driving signal 142 is "fPWM driving signal", then duty ratio "Pdout" when N-bit count data 125 is "a1" is expressed by equation (15) described below:

$$Pdout = a1 \times \frac{\frac{1}{f \text{ clock } B}}{\frac{1}{f \text{ PWM driving signal}}} \tag{15}$$

Since a drive gain is a ratio of output duty ratio vs. input duty ratio, the drive gain is expressed by following equation (16):

$$\text{drive gain} = \frac{Pdout}{Pdin} \qquad (16)$$

$$= \frac{\frac{f \text{ PWM driving signal}}{f \text{ clock } B}}{\frac{f \text{ PWM input signal}}{f \text{ clock } A}}$$

$$= \frac{f \text{ clock } A}{f \text{ clock } B} \times \frac{f \text{ PWM driving signal}}{f \text{ PWM input signal}}$$

The frequency on the input side of PWM input signal 121 is equal to the frequency on the output side of PWM driving signal 142, so that the drive gain is a ratio of "f clock A" vs. "f clock B" as expressed in equation (17).

$$\text{driving gain} = \frac{f \text{ clock } A}{f \text{ clock } B} \qquad (17)$$

The drive gain thus can be adjusted with a frequency ratio of A clock signal 126 vs. B clock signal 127.

FIG. 9 shows variations in the duty ratio of PWM driving signal 142 in response to a change in the ratio of "f clock A" vs. "f clock B".

When "f clock A"="f clock B", the duty ratio of PWM input signal 121 is equal to the duty ratio of PWM driving signal 142.

When "f clock A"<"f clock B", the duty ratio of PWM driving signal 142 becomes smaller than that of PWM input signal 121, because the drive gain is less than 1 (one).

Figure 10:
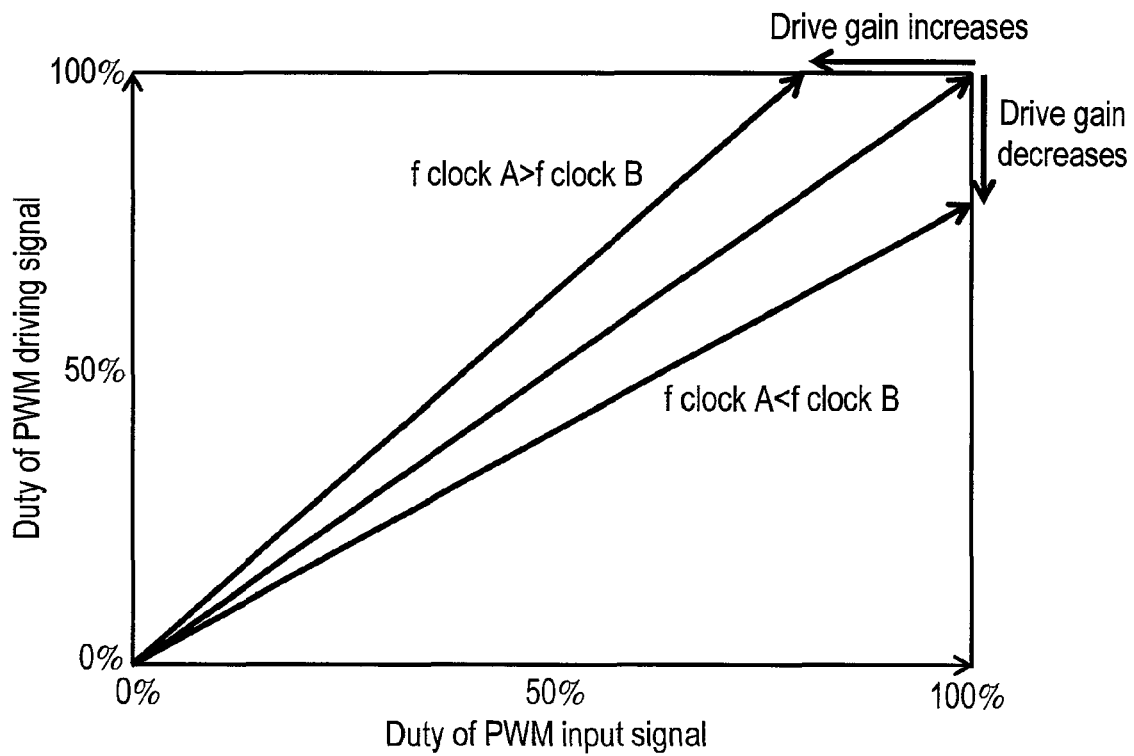
FIG. 10 shows a graph illustrating relations between a duty ratio of a PWM input signal and a duty ratio of a PWM driving signal.
Figure 11:
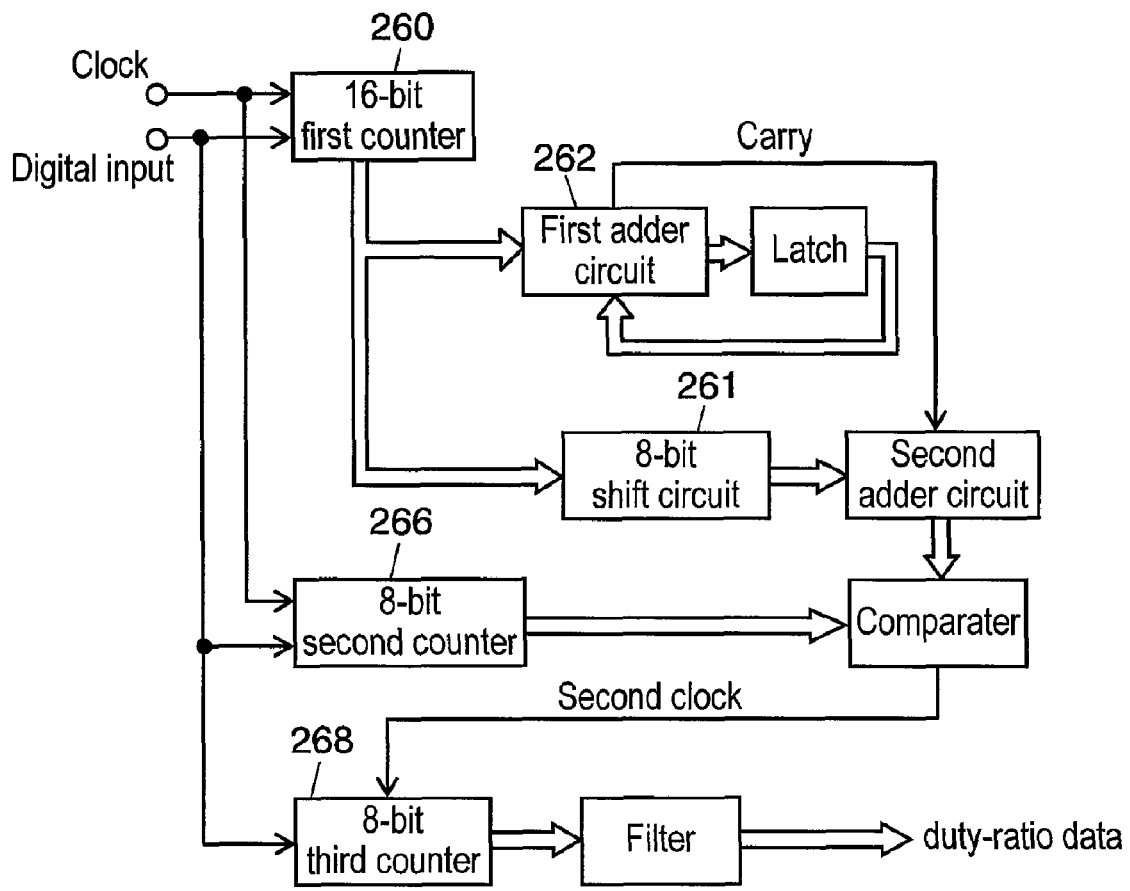
FIG. 11 shows a block diagram of a conventional PWM control detecting circuit.
Figure 12:
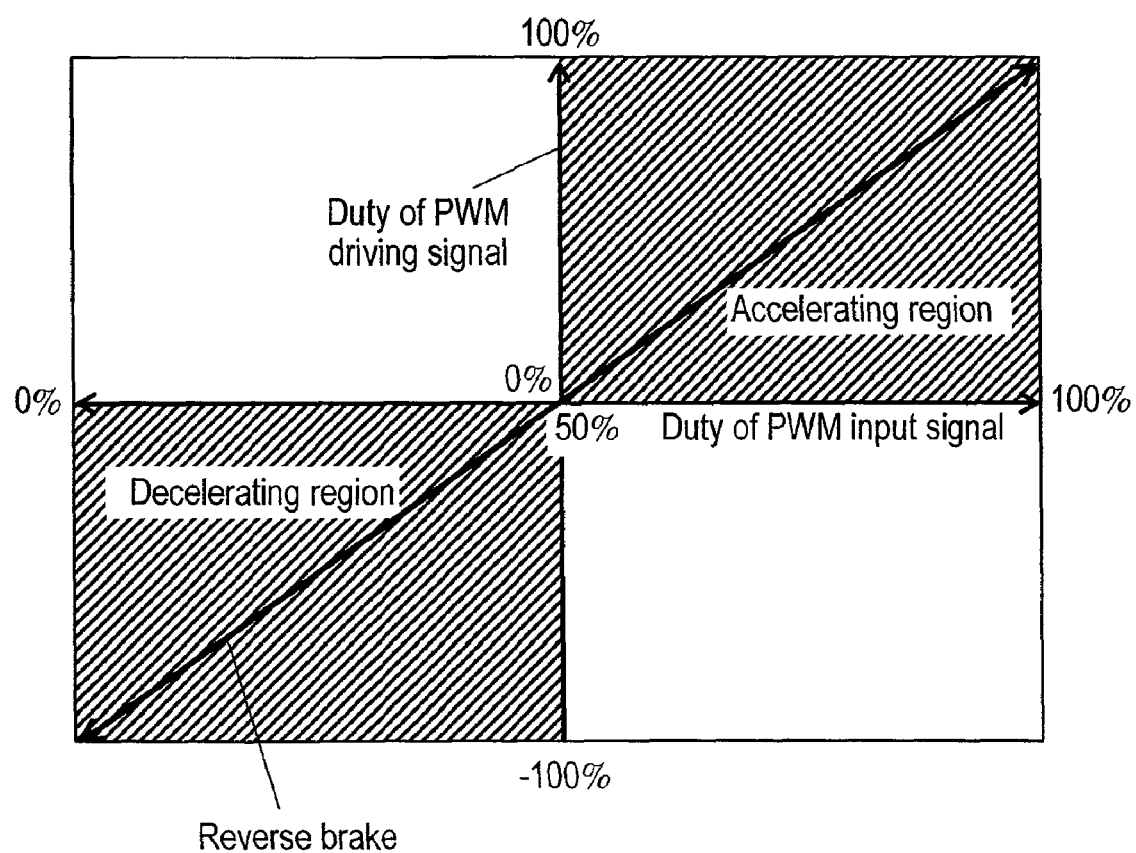
FIG. 12 shows a graph illustrating relations between inputs and outputs of a PWM driving signal which controls an rpm of a brushless motor.

When "f clock A">"f clock B", the duty ratio of PWM driving signal 142 becomes greater than that of PWM input signal 121, because the drive gain is over 1 (one). FIG. 10 shows a graph illustrating relations between a duty ratio of a PWM input signal and a duty ratio of a PWM driving signal.

Figure 8:
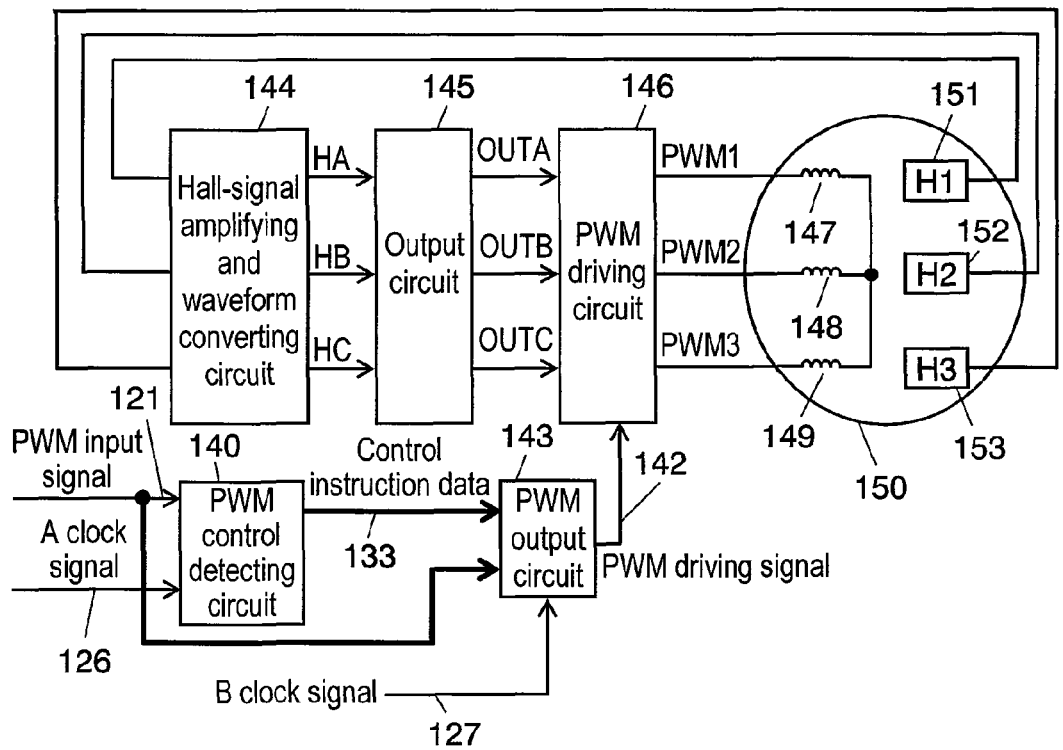
FIG. 8 shows a block diagram illustrating the brushless motor driving circuit in accordance with the third embodiment of the present invention.

A structure of the brushless motor of the present invention is described hereinafter. FIG. 8 shows a block diagram of a brushless motor driving circuit. In FIG. 8, motor section 150 of the motor includes position sensors 151, 152, 153 and stator coils 147, 148, 149. Position sensors 151, 152, 153 sense the position of the rotor, and their outputs are waveform-shaped by hall-signal amplifying and waveform converting circuit 144, and then the outputs are supplied to output circuit 145, which generates a driving signal that issues an instruction for a switch timing about exciting stator coils 147, 148, and 149. PWM driving circuit 146 controls a duty ratio of a current which drives stator coils 147, 148 and 149, thereby controlling an rpm of the motor.

PWM driving signal 142 produced by PWM control detecting circuit 140 and PWM output circuit 143 prompts PWM driving circuit 146 to work.

In this third embodiment, the duty ratios of the PWM input signal and the PWM driving signal are studied mainly on the high level for the description to be simplified. However, the logic can be in a reverse order depending on a circuit structure, and the duty ratios on the low level can be mainly studied. In such a case, not to mention, advantages and operation similar to what is discussed above can be obtained.

INDUSTRIAL APPLICABILITY

A brushless motor driving circuit of the present invention needs no multiplication circuit or division circuit in a control circuit for controlling an rpm of the brushless motor in response to a duty of a PWM signal. The driving circuit allows a change in a PWM drive control gain. The driving circuit is thus useful as a brushless motor driving circuit which can drive a brushless motor by a PWM method.

The invention claimed is:

1. A brushless motor driving circuit comprising:
    a deviation detector for receiving a PWM input signal which issues an instruction for rpm control, and detecting a deviation from duty ratio 50% of the PWM input signal;
    a determiner for detecting a comparison result at a threshold of duty ratio 50%; and
    a PWM output circuit for receiving a PWM reference signal having duty ratio 50% and producing a PWM driving signal, to be used for driving the brushless motor, in response to the deviation and the comparison result,
    wherein the PWM driving signal is produced by adding the deviation to the PWM reference signal when the PWM input signal has a duty ratio over 50%, and by subtracting the deviation from the PWM reference signal when the PWM input signal has a duty ratio less than 50%.

2. The brushless motor driving circuit of claim 1, wherein the deviation detector includes a first counter which receives a first clock signal and counts the first clock signal, then outputs the deviation as a deviation count value,
    wherein the determiner includes a D flip-flop for outputting a determination signal having a threshold at duty ratio 50%,
    wherein the PWM output circuit includes a second counter for counting a second clock signal, and the second counter starts the count, based on the determination signal, at a timing when the PWM input signal falls from a high level to a low level when the PWM input signal has a duty ratio over 50%, and stops the count when a counted value agrees with the deviation count value supplied from the deviation detector, and a time duration of the count is added to a high level period of the PWM reference signal, and when the PWM input signal has a duty ratio less than 50%, the second counter starts the count at a timing when the PWM input signal rises from the low level to the high level and stops the count when a counted value agrees with the deviation count value supplied from the deviation detector, and a time duration of the count is subtracted from the high level period of the PWM reference signal.

3. The brushless motor driving circuit of claim 2, wherein the deviation detector further includes a first edge sensing circuit for sensing a rising edge of the PWM input signal,
    wherein the first counter up-counts the first clock signal when the PWM input signal stays on a high level, and down-counts the first clock signal when the PWM input signal stays on a low level, and outputs an underflow signal when a counted value underflows, and is reset by an output from the first edge sensing circuit.

4. The brushless motor driving circuit of claim 2, wherein the determiner includes:
    a data register for receiving a value counted by the first counter at a rising edge of the PWM input signal;

a first latch circuit for retaining an underflow signal supplied from the first counter;

the D flip-flop for receiving an output from the first latch circuit and outputting a Q output signal at the rising edge of the PWM input signal;

an exclusive NOR gate for receiving an output from the data register and the Q output signal;

a subtracter for receiving an output from the exclusive NOR gate, and subtracting 1 (one) from its input before outputting when the Q output signal stays on a high level, and outputting its input as it is when the Q output signal stays on a low level, and a shift register for receiving the output from the subtracter and shifting the output to the right by one bit, wherein the determiner outputs data, which corresponds to the deviation, from the shift register, and outputs the Q output signal from the D flip-flop as a determination signal having a threshold at duty ratio 50% of the PWM input signal.

5. The brushless motor driving circuit of claim 1, wherein the PWM output circuit includes:

a first exclusive OR gate for receiving the PWM reference signal;

a second edge sensing circuit for sensing a rising edge of an output from the first exclusive OR gate;

a second counter, to be reset by an output from the second edge sensing circuit, for up-counting a second clock signal until its counted value agrees with a data value supplied from the determiner, and outputting an agreed output upon agreeing before stopping the up-count;

a second latch circuit, to be reset by the agreed output, for latching the output from the second edge sensing circuit; and a second exclusive OR gate for receiving an output from the second latch circuit and the PWM reference signal, wherein the PWM output circuit outputs the PWM driving signal from the second exclusive OR gate.

6. The brushless motor driving circuit of claim 2, wherein the determiner includes:

a data register for receiving a value counted by the first counter at a rising edge of the PWM input signal;

a first latch circuit for retaining an underflow signal supplied from the first counter;

the D flip-flop for receiving an output from the first latch circuit and outputting a Q output signal at the rising edge of the PWM input signal; and a shift register for shifting an output from the data register to the right by one bit, wherein the determiner outputs data, which corresponds to the deviation, from the shift register, and outputs the Q output signal from the D flip-flop as the determination signal having a threshold of duty ratio 50% of the PWM input signal.

7. The brushless motor driving circuit of claim 1, wherein the deviation detector includes a first counter which receives a first clock signal and counts the first clock signal, then outputs the deviation as a deviation count value, wherein the determiner includes a D flip-flop for outputting a determination signal having a threshold at duty ratio 50%, wherein the PWM output circuit includes a second counter for counting a second clock signal, and based on a comparison result at the determiner, a time duration from starting the count until a counted value agrees with the deviation count value supplied from the first counter is added to a high level period of the PWM reference signal when the PWM input signal has a duty ratio over 50%, and the time duration is subtracted from the high level period of the PWM reference signal when the PWM input signal has a duty ratio less than 50% for producing a signal, and the PWM output circuit outputs the signal thus produced as the PWM driving signal, so that a ratio of a frequency ratio between the first clock signal and the PWM input signal vs. a frequency ratio between the second clock signal and the PWM driving signal is adjustable.

8. The brushless motor driving circuit of claim 7, wherein the deviation detector further includes a first edge sensing circuit for sensing a rising edge of the PWM input signal, wherein the first counter up-counts the first clock signal when the PWM input signal stays on a high level, and down-counts the first clock signal when the PWM input signal stays on a low level, and outputs an underflow signal when a counted value underflows, and is reset by an output from the first edge sensing circuit.

9. The brushless motor driving circuit of claim 7, wherein the determiner includes:

a data register for receiving a value counted by the first counter at a rising edge of the PWM input signal;

a first latch circuit for retaining an underflow signal supplied from the first counter;

the D flip-flop for receiving an output from the first latch circuit and outputting a Q output signal at the rising edge of the PWM input signal;

an exclusive NOR gate for receiving an output from the data register and the Q output signal;

a subtracter for receiving an output from the exclusive NOR gate, and subtracting 1 (one) from its input when the Q output signal stays on a high level, and outputting its input as it is when the Q output signal stays on a low level, and a shift register for receiving the output from the subtracter and shifting the output to the right by one bit, wherein the determiner outputs data, which corresponds to the deviation, from the shift register, and outputs the Q output signal from the D flip-flop as a determination signal having a threshold at duty ratio 50% of the PWM input signal.

10. A brushless motor driving circuit comprising:

a first counter for receiving a first clock signal and outputting one of a high level period and a low level period of a PWM input signal, which issues an instruction for rpm control, as a counted value of the first clock signal; and a second counter for receiving a second clock signal and counting the second clock signal, wherein a time duration from when the second counter starts the count until its count value agrees with a value counted and supplied by the first counter is used as one of a high level period and a low level period of a PWM driving signal of a brushless motor, and the PWM driving signal thus produced is output, so that a ratio of a frequency ratio between the first clock signal and the PWM signal vs. a frequency ratio between the second clock signal and the PWM driving signal is adjustable.

11. The brushless motor driving circuit of claim 10, wherein the first counter includes:

a data register for up-counting the first clock signal while the PWM input signal stays on the high level, and resetting a counted value while the PWM input signal stays on the low level, and receiving a value counted by the first counter at a falling edge of the PWM input signal;

an edge sensing circuit for sensing a rising edge of the PWM input signal;

wherein the second counter includes a latch circuit, to be reset by an output from the edge sensing circuit, for up-counting the second clock signal until its counted value agrees with a counted value supplied from the data register, and outputting an agreed output upon agreeing before stopping the up-count, and the latch circuit is reset by the agreed output and latches the output from the edge sensing circuit, wherein an output from the latch circuit is used as the PWM driving signal.

12. A brushless motor including the brushless motor driving circuit as defined in claim 1.

13. A brushless motor including the brushless motor driving circuit as defined in claim 10.

* * * * *